US006668369B1

(12) United States Patent
Krebs et al.

(10) Patent No.: US 6,668,369 B1
(45) Date of Patent: Dec. 23, 2003

(54) SOFTWARE DEBUGGING TOOL FOR DISPLAYING DYNAMICALLY WRITTEN SOFTWARE CODE

(75) Inventors: William H. Krebs, Cary, NC (US); Mark W. Lumsden, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/473,596

(22) Filed: Dec. 29, 1999

(51) Int. Cl.$^7$ ................................................ G06F 9/44
(52) U.S. Cl. ...................................... 717/125; 717/106
(58) Field of Search ................................ 717/125, 105, 717/124, 128, 135, 106–109, 126, 127; 345/700, 714, 733, 747, 760, 781; 709/202, 200, 201, 203, 217, 218, 219, 310, 313, 315, 317, 332; 707/513, 501.1, 526

(56) References Cited

U.S. PATENT DOCUMENTS

| | | | |
|---|---|---|---|
| 5,513,317 A | 4/1996 | Borchardt et al. | 714/45 |
| 5,572,643 A | 11/1996 | Judson | 709/218 |
| 5,835,712 A | 11/1998 | DuFresne | 709/203 |
| 5,870,606 A | 2/1999 | Lindsey | 717/128 |
| 5,896,536 A | 4/1999 | Lindsey | 717/128 |
| 5,930,512 A | 7/1999 | Boden et al. | 717/102 |
| 5,940,593 A | 8/1999 | House et al. | 717/124 |
| 5,946,488 A | * 8/1999 | Tanguay et al. | 717/127 |

(List continued on next page.)

FOREIGN PATENT DOCUMENTS

EP 0 898 235 2/1999 ............ G06F/17/20

OTHER PUBLICATIONS

Si et al. Maintaining Page Coherence for Dynamic HTML pages. ACM. 1998. pp. 767–773.*
Phillips. Designers: The Browser War Casualties. Computer. 1998. Pp. 14–21.*
Patent Abstract of WO 96/29663 (Sep. 26, 1996).
Patent Abstract of JP11085564 (Mar. 30, 1999).
Patent Abstract of CA2188699 (Jan. 23, 1997).
"Examining Microsoft's Scriptlets" by R. Dobson (WEB Techniques, vol. 3, No. 5, pp. 55–59, May 1998).
"Simple but Useful Tools for Interactive WWW Development" by R.C. Maher (Proceeding of Frontiers in Education FIE'96 26th Annual Conference (Cat. No. 96CH35946) Salt Lake City, Utah (Nov. 6–9, 1996).
"Converting HTML to Well Formed XML with Preference Based Tag Expansion", Research Disclosure (Jul. 1999) pp. 1011–1012 (Disclosed by International Business Machines Corporation 423111).
"Method for Dynamically Routing Web Requests to Different Web Servers", IBM Technical Disclosure Bulletin, vol. 40, No. 12, Dec. 1997, pp. 5–8.
"Document Object Model (DOM)", maintained by the W3C DOM WG, Mar. 8, 2000, downloaded Apr. 4, 2000 from the Internet at URL (http://www.w3.org/DOM/), copies of documents accessible via hyperlinks are not filed herewith and no representation is made as to the content of such documents (2 pages).

*Primary Examiner*—Wei Zhen
(74) *Attorney, Agent, or Firm*—Synnestvedt & Lechner LLP; Gregory M. Doudnikoff (57) ABSTRACT

A software debugging tool for assisting a programmer in locating errors in content or coding, etc. generated at the client, e.g., using scripts and/or dynamic HTML. Whereas current debugging tools, such as the "View Source" option of popular Web browsing software, permits the programmer to view only the hard-coded HTML coding as it is received from a Web server, the present invention permits the programmer to view the HTML coding and/or content generated at the client. This assists the programmer to locate errors in, or "debug", software, since it is frequently easier to detect errors in the results of an executed script than it is to detect errors in the script itself.

21 Claims, 7 Drawing Sheets

U.S. PATENT DOCUMENTS

| | | | | |
|---|---|---|---|---|
| 6,021,416 A | * | 2/2000 | Dauerer et al. | 707/200 |
| 6,189,018 B1 | * | 2/2001 | Newman et al. | 345/841 |
| 6,297,819 B1 | * | 10/2001 | Furst | 345/733 |
| 6,314,451 B1 | * | 11/2001 | Landsman et al. | 709/202 |
| 6,314,557 B1 | * | 11/2001 | Shenderovich | 717/114 |
| 6,324,683 B1 | * | 11/2001 | Fuh et al. | 717/124 |
| 6,345,383 B1 | * | 2/2002 | Ueki | 717/124 |
| 6,353,923 B1 | * | 3/2002 | Bogle et al. | 717/128 |

* cited by examiner

SOFTWARE DEBUGGING TOOL FOR DISPLAYING DYNAMICALLY WRITTEN SOFTWARE CODE

FIELD OF THE INVENTION

The present invention relates generally to an improved tool for debugging software applications. In particular, the present invention relates to a client-side debugging tool for use in debugging dynamic hypertext mark-up language (DHTML) software programs.

BACKGROUND OF THE INVENTION

The World Wide Web ("Web") is essentially a distributed depository of interconnected files stored on Web servers, i.e., computers. These computers, and others, are connected by a global communications network, the Internet.

Web browser software ("browser") running on a user's computer, i.e., a Web client, is used to access, retrieve, interpret, and display files accessible via the Internet. In the Web context, most of these files are text files written in hypertext mark-up language (HTML) code, which marks up text with special commands that control its formatting and link it with other files in a manner which can be interpreted by a browser. The coding, including HTML commands ("elements" or "tags"), is typically hidden from the user. The user views a Web page which is the browser's interpretation of the coding, including text, colors, graphics, sounds, etc. The coding is contained in a "source file", which is sent from a server. The HTML coding contained in the source file is referred to as "hard-coded" or "static" HTML.

HTML coding generated dynamically, i.e., at a client after the file leaves a server, is referred to as dynamic HTML ("DHTML"). DHTML also refers to the practice of dynamic generation of code and encompasses a combination of HTML tags, options, and programming that allows for more animated and/or more interactive Web pages. DHTML combines standards including HTML, style sheets, a scripting language, and the "Document Object Model" or "DOM" standard established by the World Wide Web Consortium or W3C and available for review at the time of filing of the application on the World Wide Web at http://www.w3c.org/dom. The Document Object Model is essentially a roadmap for a hierarchy in which variables are stored in accordance with the Document Object Model. DHTML is currently supported by recent versions of browser software, such as Netscape Communications Corp.'s Navigator® 4.0 or higher or Microsoft Corporation's Internet Explorer® 4.0 or higher. Each of the web browsers has implemented the Document Object Model to varying degrees.

A DHTML source file includes static ("hard-coded") HTML as well as a hard-coded script for generating DHTML at the client. Scripts may be written in any suitable language, e.g., Microsoft Corporation's visual basic script ("VBScript") and "JScript", Netscape Corporation's Javascript, or Perl Script. For example, a script could be used to dynamically generate coding for displaying a table on a Web page. The use of scripts for creating dynamically created HTML code (or "dynamic code") at the Web client is well known in the art. The dynamic code generated by DHTML is stored in internal variables of the web browser. The browser's interpretation of the dynamic code is displayed to the user as a web page.

Until now, a user could display, at the client, only the static HTML coding in the source file as it was received at the client from the server, e.g., using a "View Source" or web browser command. Accordingly, the "View Source" command has been used as a debugging tool for static HTML. Before the use of client-side code generation (DHTML), the viewing of static coding was sufficient for debugging purposes.

The use of DHTML to dynamically generate code at the client is becoming much more frequent. Problems, errors, or "bugs" in a script may create errors in the dynamic code. The results of erroneous DHTML code are easy for the user to find, e.g., by viewing an incomplete table using a web browser. Until now, the only mode of debugging DHTML software was to view the static script using the "View Source" browser command. However, errors in a script are typically difficult to find because of the complexity of scripting languages. Additionally, the syntax of the scripting language may be correct although the script will generate erroneous dynamic code.

Figure 1:
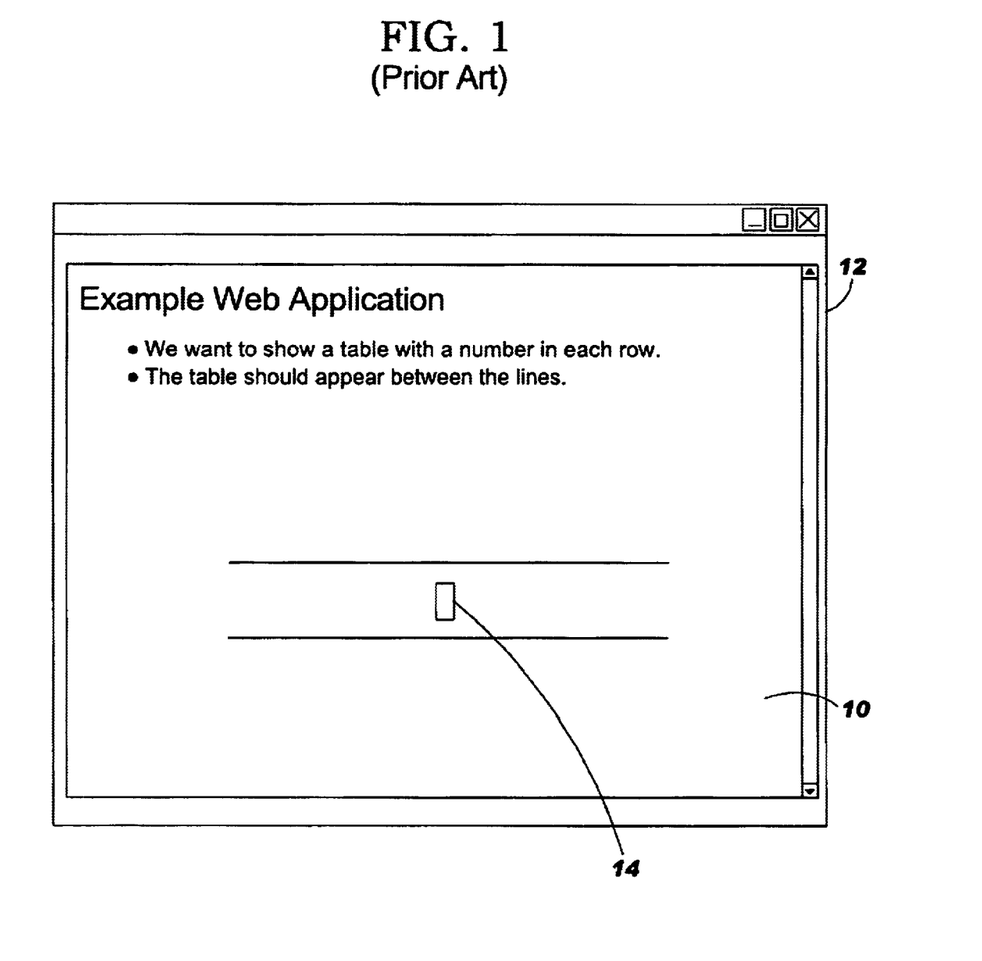
FIG. 1 is an image of an exemplary Web page showing a malformed table resulting from HTML generated dynamically by a script containing a programming error.

FIG. 1 is an image of an exemplary DHTML Web page 10 shown displayed in a Web browser window 12, as it would be seen on a user's computer and as is known in the prior art. FIG. 1 shows a malformed table 14 resulting from dynamic code generated by a script in a source file (not shown). In this example, the table should have 1 column, 5 rows, and a number between 1 and 5 should appear in each of the cells of the table. However, the script contains an error that generates dynamic code that does not produce the desired table. The result is the single-celled table 14 that appears in FIG. 1. It is readily apparent to a user that the script is faulty since the desired five-celled table is not displayed. Accordingly, the programmer would want to "debug", the Web page.

Figure 2:
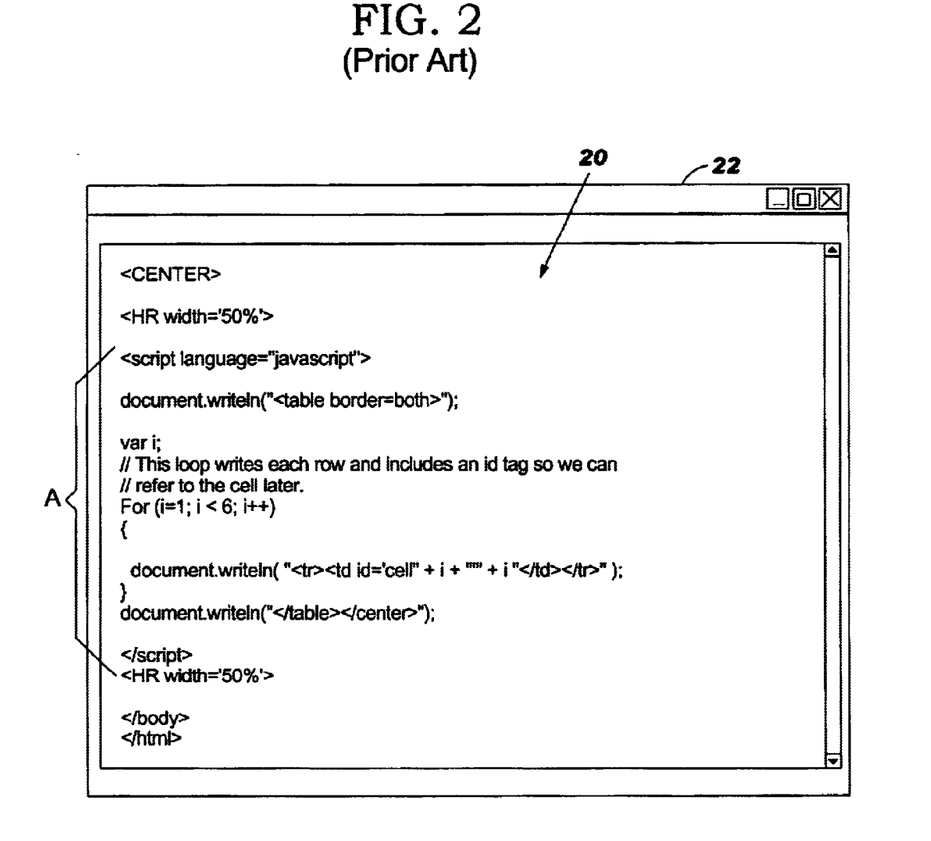
FIG. 2 is an image of a portion of the source code for displaying the Web page of FIG. 1 using a "View Source" or equivalent command of prior art Web browser software.

FIG. 2 is an image of a portion of the DHTML source file for displaying the exemplary Web page of FIG. 1. The source code 20, includes static HTML and a script (identified by the designation "All") for generating dynamic code. The source code may be displayed in a source window 22 using the "View Source" command and, as is evident, the dynamic code generated by the script A is not displayed. The erroneous script shown at "A" in FIG. 2 is written in the javascript programming language.

FIG. 2 is a display of the source file as it is received from a Web server. It is difficult by examining only the script A to determine the error that generates the erroneous dynamic code resulting in the malformed table shown in FIG. 1. Because of the syntax of HTML, it would be easy to find errors in dynamically created code generated by a script if this code was viewable. Until now, the user could not view the dynamic code. Now that DHTML is widely used, it is desirable for the user to view the dynamic code for debugging purposes.

SUMMARY OF THE INVENTION

The present invention provides a client-side software debugging tool for viewing dynamic code. Accordingly, the present invention provides a tool for assisting a programmer in locating errors in DHTML and scripts for generating dynamic code. Whereas current debugging tools, such as the "View Source" command of popular Web browser software, permit a programmer to view only static code as it is received from a Web server, e.g., a script, the present invention permits the programmer to view the dynamic code generated at the client by the script. This assists the programmer to locate errors in, or "debug", software by viewing the results of a script, rather than the script itself. Advantageously, the present invention may be used in conjunction with existing browser software by providing a viewer for viewing the browser's internal variables that are currently used to store dynamic code.

DETAILED DESCRIPTION

Figure 3:
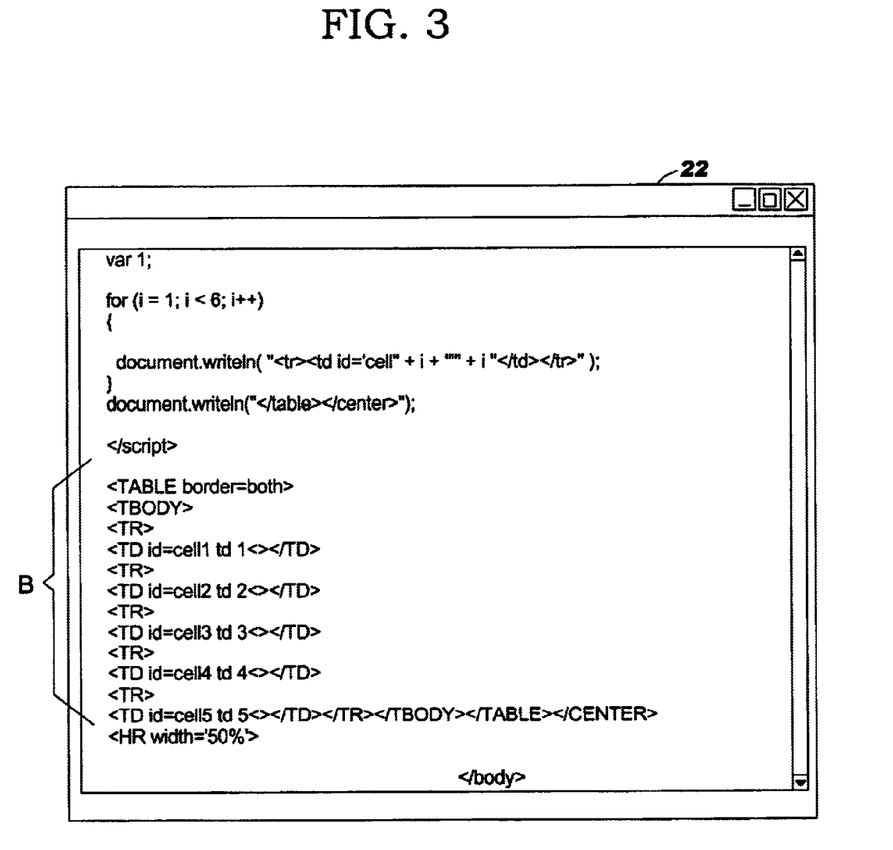
FIG. 3 is an image of a portion of the erroneous script of FIG. 2, displaying also the dynamically generated HTML coding in accordance with the present invention.

FIG. 3 is an image of a screen capture illustrating the capabilities of the present invention. As shown in FIG. 3, a portion Al of the source code 20 of FIG. 2 (i.e., part of script "A") is displayed in the source window 22. In addition, in accordance with the present invention, the dynamic code generated by the script also is displayed in the source window 22, as shown at "B" in FIG. 3.

As noted above, dynamic code generated using DHTML is stored in internal variables of browser software and, using prior art systems, can be accessed only by sophisticated programmers using programming to access the "Document Object Model". The dynamic code is not accessible for display to computer users on prior art browsers. In accordance with the present invention, the dynamic code stored in these variables is displayed to the user, at the user's request, for debugging purposes. Upon viewing the dynamic code B, it is apparent that there is an error in the syntax of the table display tags (<TD>, </TD>) and related text of the script. It is easier to detect this error by viewing the dynamic code B shown in FIG. 3 than it is to detect this error by viewing the script A for generating the dynamic code shown in FIG. 2.

The user may view the dynamic code using software in accordance with the present invention. For example, the software could be incorporated into a Web browser and the dynamic code may be viewed by selecting an appropriate menu command, or by using a hot key or key sequence, e.g., depressing the shift key while double-clicking a mouse button. When requested by the user, a computer program or subprocess of a computer program reads the appropriate internal variables of the Web browser software, identifies the dynamic code generated at the client computer, and displays the dynamic code to the user. The dynamic code may appear in a source window separate from a source window for displaying the static code or separate from a window for displaying the browser's interpretation of the code. Alternatively, the static code and dynamic code may appear in the same source window, with the dynamic code appearing in substitution for the static script for generating the dynamic code. Preferably, the dynamic code appears in the same source window as the static code in addition to the static script for generating the dynamic code, as shown in FIGS. 3 and 4.

Figure 4:
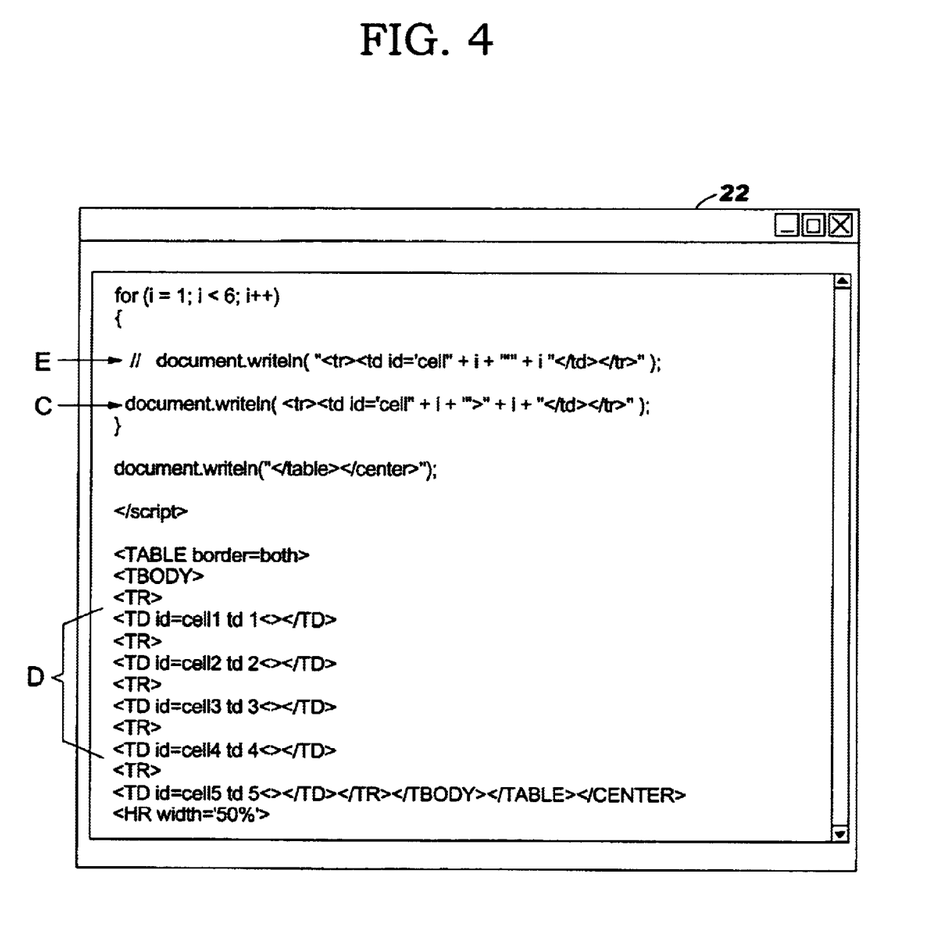
FIG. 4 is an image of a portion of the source code of FIG. 2, displaying also a revision to the script and the HTML coding generated by the revised script, in accordance with the present invention.

FIG. 4 is an image of a portion of the source code shown at "A" in FIG. 2. The source code also includes a revision to the script as shown at "C". The erroneous line of the script is shown at "E" in FIG. 4 for illustrative purposes, but has been flagged such that it will not be processed by the script. The script may be revised by a user using a text editor to edit the source file, as is known in the art. This revision to the script produces properly formatted dynamic code, as shown at "D" in FIG. 4. The revised script and the dynamic code generated by the script appear in the source window 22 for debugging purposes.

Figure 5:
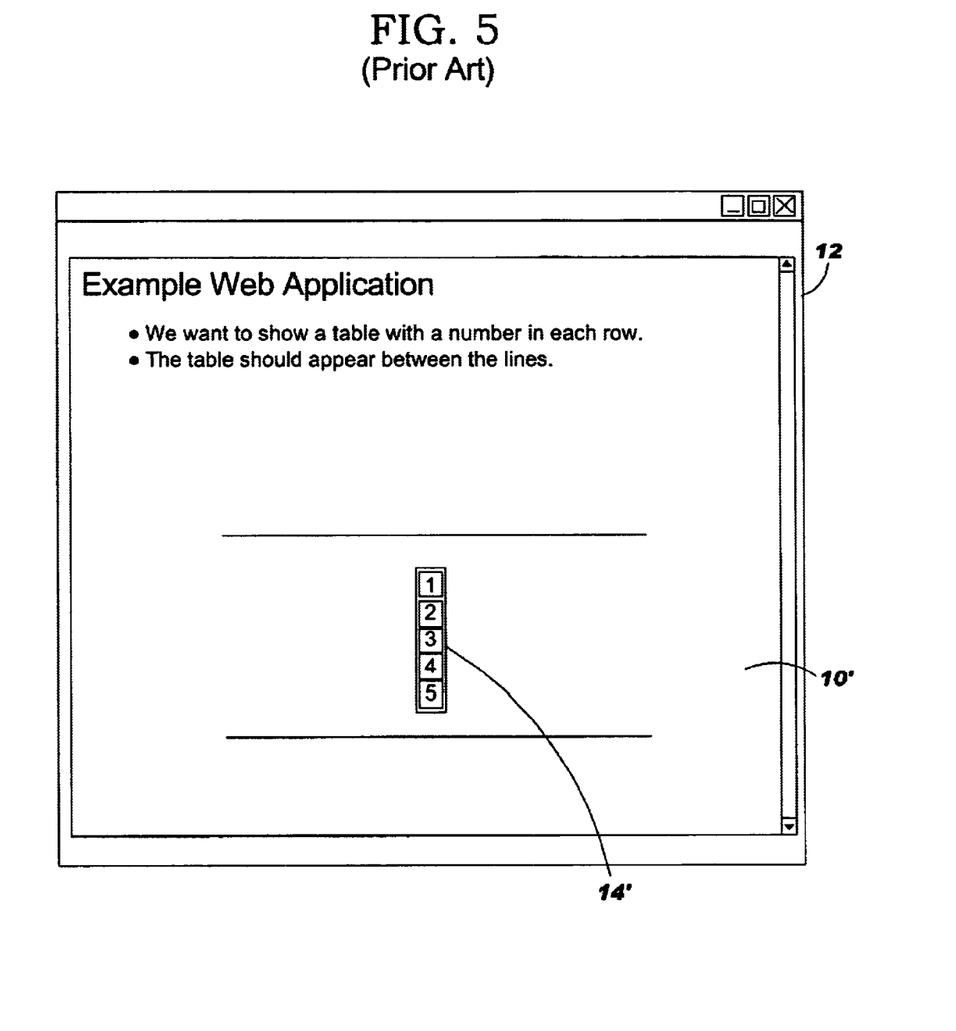
FIG. 5 is an image of an exemplary Web page showing a properly formed table resulting from the revised script shown in FIG. 4.

FIG. 5 is an image of an exemplary DHTML Web page 10'. FIG. 5 shows a properly formed table 14' resulting from properly formatted dynamic code generated by the revised script shown in FIG. 4. In other words, FIG. 5 shows a Web page which is the browser's interpretation of the revised source file, including the dynamic code shown at "D" in FIG. 4. From FIG. 5, it is apparent that the user has provided the desired table having one column, five rows, and a number between 1 and 5 in each cell of the table. The display of a table in a browser window as shown in FIG. 5 is well known in the art.

Figure 6:
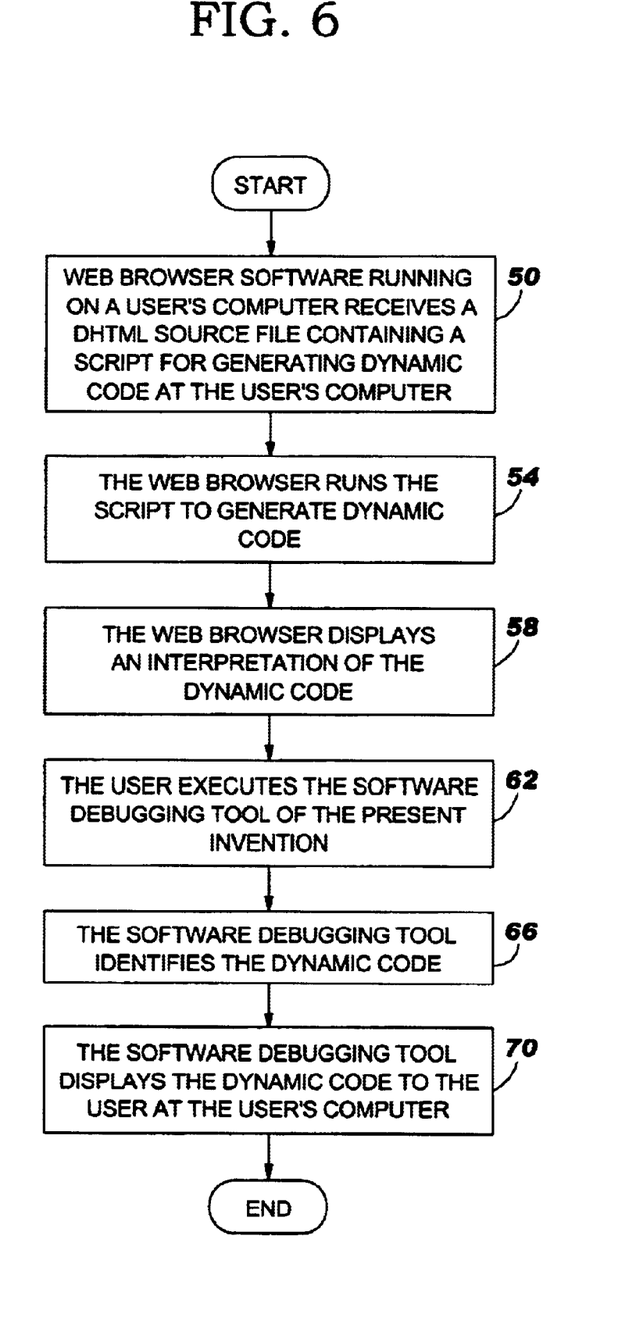
FIG. 6 is a flowchart illustrating an example of the logical steps which implement a software debugging tool in accordance with the present invention.

FIG. 6 is a flowchart illustrating an example of the logical steps which implement software debugging tool in accordance with the present invention. As shown in FIG. 6, a user's computer's web browser software receives a DHTML source file from a server, as shown at step 50. The source file contains a script for generating dynamic code at the user's computer. The web browser then runs the script to generate the dynamic code and stores the dynamic code in internal variables of the browser as known in the prior art, as shown at step 54. The web browser then displays its interpretation of the dynamic code to a user as part of a web page, as is known in the prior art, as shown at step 58. The user may then use a software debugging tool in accordance with the present invention as follows. The user first executes the software debugging tool, as shown at step 62. This may be achieved in a variety of ways as discussed above. For example, if the debugging tool is integrated into the browser, the user may simply select an appropriate menu option. Alternatively, script commands may be included in the source file to trigger the debugging tool. For example, the "onclick" command could be used to invoke the debugging tool upon the user's depression of the "shift" key and double clicking of a mouse button. The software debugging tool then identifies the dynamic code generated at the user's computer as shown at step 66, e.g., by reference to the variables of the web browser that are used to store the dynamic code, as discussed above. For example, this may be achieved using the "document.body.outerhtml" facility of the Document Object Model after generation of the dynamic code to read all of the static and dynamic code onto a single variable. Finally, the software debugging tool displays the dynamic code to the user at the user's computer, as shown at step 70. For example, this may be achieved by formatting the static and dynamic code stored in the single variable with an HTML <XMP> or "Example" tag so that the code will not be again processed but rather will be treated as a textual remark. The static and dynamic code, thus formatted, may then be displayed in a new window using the "window.open" command of the Document Object Model to open a window and the "viewer.document.body.innerhtml"

Document Object Facility to display the static and dynamic code stored in the single variable. A title may be added to the new window to indicate that all of the static and dynamic code is being displayed in the window. The user may then study the dynamic code displayed to locate errors and then identify and correct portion so the script causing generation of the erroneous code.

Figure 7:
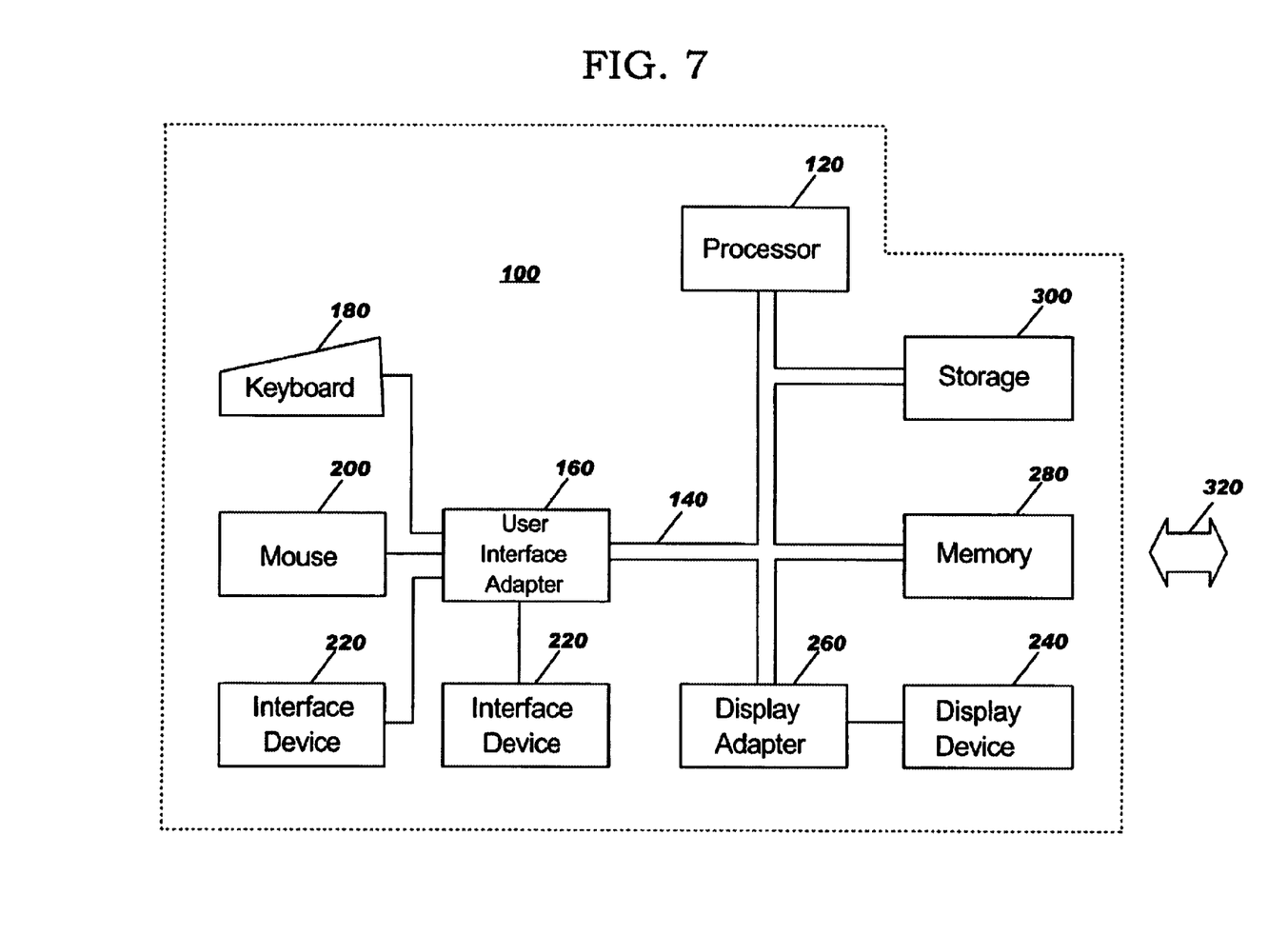
FIG. 7 is a pictorial representation of a data processing system which may be utilized to implement the present invention.

FIG. 7 illustrates a representative workstation hardware environment in which the present invention may be practiced. The environment of FIG. 7 comprises a representative single user computer workstation 100, such as a personal computer, including related peripheral devices. The workstation 100 includes a microprocessor 120 and a bus 140 employed to connect and enable communication between the microprocessor 120 and the components of the workstation 100 in accordance with known techniques. The workstation 100 typically includes a user interface adapter 160, which connects the microprocessor 120 via the bus 140 to one or more interface devices, such as keyboard 180, mouse 200, and/or other interface devices 220, which can be any user interface device, such as a touch sensitive screen, digitized entry pad, etc. The bus 140 also connects a display device 240, such as an LCD screen or video monitor, to the microprocessor 120 via a display adapter 260. The bus 140 also connects the microprocessor 120 to memory 280 and long term storage 300 which can include a hard drive, tape drive, etc.

The workstation 100 communicates via a communications channel 320 with other computers or networks of computers. The workstation 100 may be associated with such other computers in a local area network (LAN) or a wide area network, or the workstation 100 can be client in a client/server arrangement with another computer, etc. All of these configurations, as well as the appropriate communications hardware and software, are known in the art.

Software programming code which embodies the present invention is typically stored in permanent storage of some type, such as the permanent storage 300 of the workstation 100. In a client/server environment, such software programming code may be stored with storage associated with a server. The software programming code may be embodied on any of a variety of known computer readable media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known in the art.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A computer readable medium for facilitating analysis of dynamically-generated code at a client computer configured for generating dynamically-generated code, the computer readable medium comprising computer readable instructions for:

(a) identifying dynamic code generated dynamically at the client computer, the dynamic code being automatedly written without user input; and (b) displaying, at the client computer, the dynamic code.

2. The computer readable medium of claim 1, wherein step (b) comprises inserting the dynamic code into a display of a source file containing code for generating the dynamic code.

3. The computer readable medium of claim 1, further comprising computer readable instructions for:

(c) generating dynamic code at the client computer;

(d) interpreting the dynamic code for displaying a Web page; and (e) displaying the Web page.

4. The computer readable medium of claim 3, wherein the dynamic code is written in hypertext markup language and wherein steps (c), (d), and (e) are performed by Web browser software.

5. The computer readable medium of claim 4, wherein step (c) is performed by execution of a script at the client computer.

6. The computer readable medium of claim 3, further comprising instructions for performing step (b) responsive to a user's command.

7. The computer readable medium of claim 1, wherein step (a) comprises reading data from variables of Web browser software.

8. A method of analyzing a source file containing static code for generating dynamic code at a client computer, the method comprising the steps of:

(a) generating, at the client, the dynamic code, the dynamic code being automatedly written without user input; and (b) displaying, at the client, the dynamic code generated in step (a).

9. The method of claim 8, further comprising the step of:

(c) receiving, at the client, the file containing the static code, step (c) being performed before step (a).

10. The method of claim 9, wherein the static code comprises hypertext markup language code and a script for generating dynamic code written in hypertext markup language.

11. The method of claim 10, wherein the script is written in Javascript.

12. An apparatus for analyzing a source file comprising static code for displaying elements of a Web page, the static code comprising a script executable at a client computer for generating dynamic code for displaying elements of a Web page, the apparatus comprising:

(a) a code generator for generating the dynamic code, the dynamic code being automatedly written without user input; and (b) a display device for displaying the dynamic code generated in step (a).

13. The apparatus of claim 12, further comprising:

(c) an interpreter for interpreting the static code and the dynamic code and for displaying elements of the Web page.

14. Computer readable code stored on media for assisting a user to analyze source code for display of a Web page, comprising:

first subprocesses for identifying dynamic code generated by a script executed at a Web client the dynamic code being autometedly written without user input;

second subprocesses for displaying the dynamic code to a user.

15. Computer readable code stored on media according to claim 14, wherein the dynamic code is written in hypertext markup language.

16. Computer readable code stored on media according to claim 14, wherein the first subprocesses read the dynamic code from variables of Web browser software after interpretation of the script.

17. Computer readable code stored on media according to claim 14, wherein the Web page is displayed in a first window on a video monitor and wherein the second subprocesses display the dynamic code in a second window on the video monitor.

18. Computer readable code stored on media according to claim 17, wherein the second subprocesses display the source code in the second window on the video monitor in addition to the script for generating the dynamic code.

19. Computer readable code stored on media according to claim 17, wherein the second subprocesses displays the source code in the second window on the video monitor with the dynamic code in substitution for the script for generating the dynamic code.

20. Computer readable code stored on media according to claim 14, further comprising:

third subprocesses for generating the dynamic code at a Web client.

21. Computer readable code stored on media according to claim 20, further comprising:

fourth subprocesses for interpreting the source code and displaying the Web page.

* * * * *